(12) United States Patent
Verma (10) Patent No.: US 9,436,654 B1
(45) Date of Patent: Sep. 6, 2016

(54) METHODS AND SYSTEMS FOR PROCESSING TASK MANAGEMENT FUNCTIONS IN A CLUSTER HAVING AN INTELLIGENT STORAGE ADAPTER

(71) Applicant: QLOGIC, Corporation, Aliso Viejo, CA (US)

(72) Inventor: Anurag Verma, Pune (IN)

(73) Assignee: QLOGIC, Corporation, Aliso Viejo, CA (US)

( * ) Notice: Subject to any disclaimer, the term of this patent is extended or adjusted under 35 U.S.C. 154(b) by 155 days.

(21) Appl. No.: 14/312,130

(22) Filed: Jun. 23, 2014

(51) Int. Cl.
G06F 15/167 (2006.01)
G06F 15/173 (2006.01)
G06F 3/06 (2006.01)

(52) U.S. Cl.
CPC ....... *G06F 15/17331* (2013.01); *G06F 3/0604* (2013.01); *G06F 3/067* (2013.01); *G06F 3/0658* (2013.01); *G06F 3/0683* (2013.01); G06F 2003/0697 (2013.01)

(58) Field of Classification Search
USPC ....... 709/203, 213, 216, 219, 224, 226, 229, 709/245
See application file for complete search history.

(56) References Cited

U.S. PATENT DOCUMENTS

| | | | |
|---|---|---|---|
| 5,689,678 | A | 11/1997 | Stallmo et al. |
| 6,219,676 | B1 | 4/2001 | Reiner |
| 6,467,022 | B1 | 10/2002 | Buckland et al. |
| 6,484,229 | B1 | 11/2002 | Ichikawa et al. |
| 6,502,205 | B1 | 12/2002 | Yanai et al. |
| 6,745,324 | B1 * | 6/2004 | Skazinski ............... G06F 8/60 713/2 |
| 6,799,283 | B1 | 9/2004 | Tamai et al. |
| 6,922,754 | B2 | 7/2005 | Liu et al. |
| 7,013,336 | B1 | 3/2006 | King |
| 7,249,221 | B2 | 7/2007 | Shimada |
| 7,272,674 | B1 * | 9/2007 | Nandi et al. .................. 710/38 |
| 7,356,573 | B2 | 4/2008 | Sharma et al. |
| 7,506,124 | B2 | 3/2009 | Sharma et al. |
| 7,617,289 | B2 | 11/2009 | Srinivasan et al. |
| 7,631,155 | B1 | 12/2009 | Bono et al. |
| 7,685,269 | B1 * | 3/2010 | Thrasher et al. ............. 709/224 |
| 7,865,663 | B1 * | 1/2011 | Nelson .................. G06F 13/42 711/112 |
| 7,873,619 | B1 | 1/2011 | Faibish et al. |
| 8,099,499 | B2 | 1/2012 | Oeda |
| 8,510,265 | B1 | 8/2013 | Boone et al. |

(Continued)

OTHER PUBLICATIONS

"International Search Report on corresponding PCT application (PCT/US2013/042918) from International Searching Authority (USPTO) dated Nov. 27, 2013".

(Continued)

*Primary Examiner* — Michael Y Won
(74) *Attorney, Agent, or Firm* — Klein, O'Neill & Singh, LLP (57) ABSTRACT

Methods and systems for processing task management requests are provided. A cache client adapter receives a task management request other than an abort for a logical storage object owned by a cache owner adapter and determines if there are any pending input/output (I/O) requests associated with the storage object. The cache client adapter sends an abort request to the cache owner adapter when there are pending I/O requests and sends the task management request directly to a controller that manages a storage device whose space is presented as the logical storage object; and sends only the task management request to the controller when there are no pending I/O requests for the logical storage object.

21 Claims, 5 Drawing Sheets

(56) References Cited

U.S. PATENT DOCUMENTS

| | | | |
|---|---|---|---|
| 8,555,022 | B1 | 10/2013 | Edwards et al. |
| 8,589,550 | B1 | 11/2013 | Faibish et al. |
| 8,626,967 | B1* | 1/2014 | Naik ............... G06F 13/14 710/31 |
| 8,639,872 | B1 | 1/2014 | Boyle et al. |
| 8,805,951 | B1 | 8/2014 | Faibish et al. |
| 8,863,145 | B2 | 10/2014 | Watanabe et al. |
| 9,009,444 | B1 | 4/2015 | Derbeko et al. |
| 9,172,586 | B1 | 10/2015 | Shah et al. |
| 9,232,005 | B1 | 1/2016 | Shah et al. |
| 2003/0135782 | A1 | 7/2003 | Matsunami et al. |
| 2003/0140209 | A1* | 7/2003 | Testardi ............ G06F 3/0601 711/203 |
| 2003/0172149 | A1 | 9/2003 | Edsall et al. |
| 2005/0027798 | A1 | 2/2005 | Chiou et al. |
| 2005/0210314 | A1 | 9/2005 | Iguchi |
| 2006/0031653 | A1 | 2/2006 | Todd et al. |
| 2006/0075190 | A1 | 4/2006 | Higaki et al. |
| 2006/0095709 | A1 | 5/2006 | Achiwa |
| 2006/0218362 | A1 | 9/2006 | McManis |
| 2006/0282618 | A1 | 12/2006 | Thompson et al. |
| 2007/0016681 | A1 | 1/2007 | Suzuki et al. |
| 2007/0028073 | A1 | 2/2007 | Takayama et al. |
| 2008/0071984 | A1 | 3/2008 | Araki et al. |
| 2008/0104259 | A1* | 5/2008 | LeFevre ............ H04L 67/1097 709/228 |
| 2008/0114961 | A1* | 5/2008 | Ramaswamy ........ G06F 3/061 711/170 |
| 2008/0270700 | A1 | 10/2008 | Rao et al. |
| 2008/0270727 | A1 | 10/2008 | Jacobson et al. |
| 2009/0055507 | A1 | 2/2009 | Oeda |
| 2009/0064161 | A1* | 3/2009 | Hosouchi et al. ............ 718/104 |
| 2009/0187713 | A1 | 7/2009 | Zedlewski et al. |
| 2009/0210620 | A1 | 8/2009 | Jibbe et al. |
| 2009/0248975 | A1* | 10/2009 | Daud ............... G06F 11/0709 711/112 |
| 2009/0265507 | A1 | 10/2009 | Jibbe et al. |
| 2010/0281230 | A1 | 11/2010 | Rabii et al. |
| 2011/0087833 | A1 | 4/2011 | Jones |
| 2011/0138136 | A1 | 6/2011 | Shitomi et al. |
| 2011/0191534 | A1 | 8/2011 | Ash et al. |
| 2011/0197046 | A1 | 8/2011 | Chiu et al. |
| 2011/0238672 | A1 | 9/2011 | Agarwala et al. |
| 2011/0276746 | A1 | 11/2011 | Pruthi et al. |
| 2011/0289279 | A1 | 11/2011 | Sonnier et al. |
| 2012/0005668 | A1 | 1/2012 | Serizawa et al. |
| 2012/0089786 | A1 | 4/2012 | Pruthi |
| 2012/0102137 | A1 | 4/2012 | Pruthi et al. |
| 2012/0137059 | A1 | 5/2012 | Yang et al. |
| 2012/0159053 | A1 | 6/2012 | Kano et al. |
| 2012/0221729 | A1 | 8/2012 | Hara et al. |
| 2012/0254504 | A1 | 10/2012 | Syu et al. |
| 2012/0254509 | A1 | 10/2012 | Cleveland et al. |
| 2012/0331222 | A1 | 12/2012 | Jibbe et al. |
| 2013/0042048 | A1 | 2/2013 | Kutergin et al. |
| 2013/0080715 | A1 | 3/2013 | Mori et al. |
| 2013/0111474 | A1 | 5/2013 | Agarwal et al. |
| 2013/0132673 | A1 | 5/2013 | Saito et al. |
| 2013/0198457 | A1 | 8/2013 | Kobayashi et al. |
| 2013/0198459 | A1 | 8/2013 | Joshi |
| 2013/0238851 | A1 | 9/2013 | Chang et al. |
| 2013/0282982 | A1 | 10/2013 | Hayashi |
| 2013/0290571 | A1 | 10/2013 | Rizzo et al. |
| 2013/0332612 | A1* | 12/2013 | Cai et al. ............... 709/226 |
| 2013/0339600 | A1* | 12/2013 | Shah ............... 711/114 |
| 2014/0013027 | A1 | 1/2014 | Jannyavula Venkata et al. |
| 2014/0122778 | A1 | 5/2014 | O'Brien |
| 2014/0129521 | A1 | 5/2014 | Marsden |
| 2014/0244935 | A1* | 8/2014 | Ezra et al. ............... 711/133 |
| 2014/0258533 | A1 | 9/2014 | Antony |
| 2015/0058547 | A1 | 2/2015 | Thatcher et al. |
| 2015/0134920 | A1 | 5/2015 | Anderson et al. |
| 2015/0143023 | A1 | 5/2015 | Rostoker et al. |

OTHER PUBLICATIONS

"Written Opinion on corresponding PCT application (PCT/US2013/042918) from International Searching Authority (USPTO) dated Nov. 27, 2013".

"Office Action from USPTO dated Dec. 24, 2014 for U.S. Appl. No. 13/790,395".

"International Preliminary Report on Patentability on corresponding PCT application (PCT/US2013/042918) from International Bureau (WIPO) dated Dec. 16, 2014".

"Office Action from USPTO dated Feb. 20, 2015 for U.S. Appl. No. 13/790,894".

"Office Action from USPTO dated Feb. 24, 2015 for U.S. Appl. No. 13/902,427".

"Office Action from USPTO dated Mar. 3, 2015 for U.S. Appl. No. 13/790,800".

"Office Action from USPTO dated Mar. 11, 2015 for U.S. Appl. No. 13/790,846".

"Office Action from USPTO dated Mar. 27, 2015 for U.S. Appl. No. 13/790,471".

"Office Action from USPTO dated May 7, 2015 for U.S. Appl. No. 13/790,499".

"QLOGIC 10000 Series QLogic FabricCache Adapter Data Sheet", (Nov. 2013).

"Notice of Allowance from USPTO dated Aug. 14, 2015 for U.S. Appl. No. 13/790,846".

"Final Office Action from USPTO dated Aug. 18, 2015 for U.S. Appl. No. 13/790,395".

"VMWare Storage Best Practices", *VMWare*, (Apr. 2011), https://www.vmware.com/files/pdf/support/landing_pages/Virtual-Support-Day-Storage-Best-Practices-June-2012.pdf.

"Notice of Allowance from USPTO dated Aug. 26, 2015 for U.S. Appl. No. 13/902,427".

"Notice of Allowance from USPTO dated Sep. 23, 2015 for U.S. Appl. No. 14/088,082".

"Final Office Action from USPTO dated Sep. 24, 2015 for U.S. Appl. No. 13/790,800".

"Final Office Action from USPTO dated Oct. 8, 2015 for U.S. Appl. No. 13/790,471".

"Final Office Action from USPTO dated Sep. 15, 2015 for U.S. Appl. No. 13/790,894".

"Office Action from USPTO dated Oct. 19, 2015 for U.S. Appl. No. 14/165,100".

"Final Office Action from USPTO dated Oct. 23, 2015 for U.S. Appl. No. 13/790,499".

"Office Action from USPTO dated Dec. 4, 2015 for U.S. Appl. No. 14/193,691".

"Notice of Allowance from USPTO dated Nov. 25, 2015 for U.S. Appl. No. 13/790,846".

"Office Action from USPTO dated Dec. 21, 2015 for U.S. Appl. No. 14/302,706".

"Notice of Allowance from USPTO dated Jan. 15, 2016 for U.S. Appl. No. 13/790,395".

"Extended European Search Report from EPO dated Jan. 28, 2016 for EP Application No. 13803862.5".

"Notice of Allowance from USPTO dated Jan. 29, 2016 for U.S. Appl. No. 14/470,309".

"Office Action from USPTO dated Feb. 26, 2016 for U.S. Appl. No. 13/790,499".

"Notice of Allowance from USPTO dated Mar. 1, 2016 for U.S. Appl. No. 13/790,471".

"Notice of Allowance from USPTO dated Mar. 1, 2016 for U.S. Appl. No. 14/470,337".

"Office Action from USPTO dated Mar. 2, 2016 for U.S. Appl. No. 14/593,898".

"Notice of Allowance from USPTO dated Mar. 30, 2016 for U.S. Appl. No. 13/790,471".

"Notice of Allowance from USPTO dated Apr. 11, 2016 for U.S. Appl. No. 13/790,395".

"Final Office Action from USPTO dated Apr. 21, 2016 for U.S. Appl. No. 14/165,100".

(56) References Cited

OTHER PUBLICATIONS

"Notice of Allowance from USPTO dated Apr. 26, 2016 for U.S. Appl. No. 14/498,580".
"Office Action from USPTO dated May 6, 2016 for U.S. Appl. No. 14/339,086".
"Notice of Allowance from USPTO dated May 27, 2016 for U.S. Appl. No. 14/302,706".
Office Action from USPTO dated Jun. 6, 2016 for U.S. Appl. No. 13/790,894.
Office Action from USPTO dated Jun. 6, 2016 for U.S. Appl. No. 13/790,800.
Final Office Action from USPTO dated Jun. 13, 2016 for U.S. Appl. No. 14/193,691.
Notice of Allowance from USPTO dated Jul. 5, 2016 for U.S. Appl. No. 14/302,706.

* cited by examiner

METHODS AND SYSTEMS FOR PROCESSING TASK MANAGEMENT FUNCTIONS IN A CLUSTER HAVING AN INTELLIGENT STORAGE ADAPTER

TECHNICAL FIELD

The present disclosure relates to storage systems and more particularly to storage systems using storage adapters in a cluster.

BACKGROUND

A computer network, often simply referred to as a network, is a group of interconnected computers and devices that facilitates communication among users and allows users to share resources. Adapters, switches and other devices are typically used during network communication for reading and writing data at mass storage devices.

Computing devices (or systems) use mass storage devices to store data. Data centers are commonly used to store large amounts of data for computing devices. Different storage options are available for computing devices to store data and retrieve data. For example, storage options include direct-attached storage (DAS), network attached storage (NAS), and storage area networks (SANs).

A DAS system typically includes a plurality of storage drives that are directly attached to a computing device (for example, a server) and is accessible via a host bus adapter (HBA). Common protocols used for DAS storage devices are SCSI (Small Computer Systems Interface), ATA (AT attachment), SATA (Serial ATA), SAS (Serial Attached SCSI) and others.

NAS is a file level storage that provides access to a plurality of computing devices. NAS typically uses network file sharing protocols, for example, NFS (Networked File System), CIFS (Common Internet File System) and others for storing and managing data at storage devices.

SAN is a dedicated network that provides access to consolidated, block level data storage. SANs are primarily used to make storage devices, such as disk arrays, tape libraries, and others, accessible to servers so that the devices appear like locally attached devices to an operating system of a computing device. A SAN typically has its own network of storage devices that are generally not accessible through the local area network by other devices. SANs often utilize a Fibre Channel fabric topology, an infrastructure specially designed to handle storage communications. SANs may also use iSCSI (i.e. mapping SCSI over TCP/IP (Transmission Control Protocol/Internet Protocol), Fibre Channel over Ethernet (FCoE), FCP (Fibre Channel over SCSI), Hyper SCSI (i.e. SCSI over Ethernet) and other protocols for storing data at storage devices.

Fibre Channel protocol (FCP) is used to send a SCSI command or a task management request. When an initiator sends a command or request using Fibre Channel, then a FCP_CMD information unit (IU) is sent to a target. FCP_CMD IU indicates a task management function that may have to be performed. Examples of task management functions include aborting a task, aborting a set of tasks, resetting a target, resetting a logical unit identifier (LUN), a query to determine a state of a specific task, a bus reset operation and others. Continuous efforts are being made to efficiently perform task management functions.

BRIEF DESCRIPTION OF THE DRAWINGS

The various present embodiments relating to the management of network elements now will be discussed in detail with an emphasis on highlighting the advantageous features. These novel and non-obvious embodiments are depicted in the accompanying drawings, which are for illustrative purposes only. These drawings include the following figures, in which like numerals indicate like parts.

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system," and "functionality," as used herein, generally represent software, firmware, hardware, or a combination of these elements. For instance, in the case of a software implementation, the terms "logic," "module," "component," "layer," "system," and "functionality" represent executable instructions that perform specified tasks when executed on a hardware based processing device or devices (e.g., CPU or CPUs). The program code can be stored in one or more non-transitory, computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The embodiments disclosed herein may be implemented as a computer process (method), a computing system, or as an article of manufacture, such as a computer program product or computer-readable media. The computer program product may be non-transitory, computer storage media, readable by a computer device, and encoding a computer program of instructions for executing a computer process. The computer program product may also be readable by a computing system, and encoding a computer program of instructions for executing a computer process.

In one embodiment, an adapter, for example, a network device is provided. The adapter includes a storage protocol controller having a port for interfacing with a storage area network (SAN) based storage device and another adapter operating within a cluster is provided. The adapter includes a processor executing instructions for managing a local storage device that is configured to operate as a caching device for a computing device. The adapter operates as a host bus adapter and a storage controller for managing storage space at the local storage device and the SAN-based storage device.

Figure 1A:
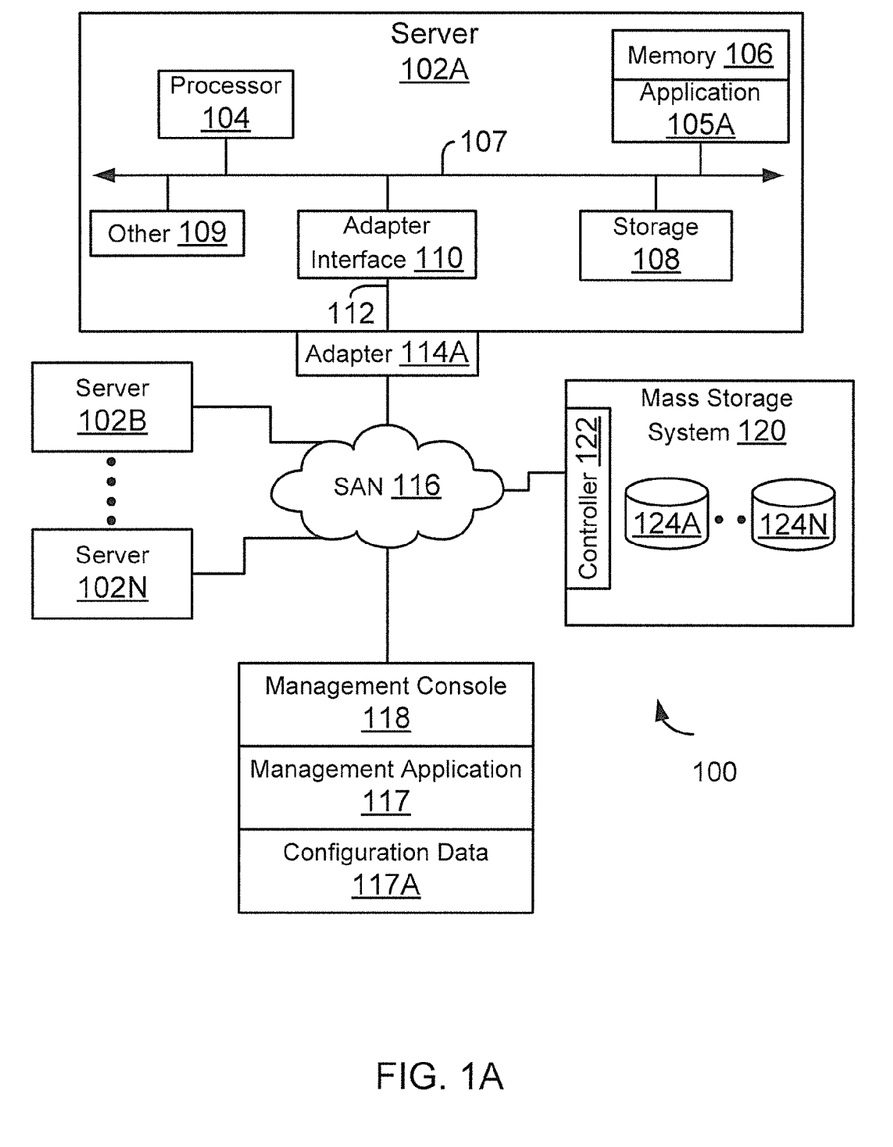
FIG. 1A is a functional block diagram of a system, used according to one embodiment.

System 100:

FIG. 1A is a block diagram of a system 100 configured for use with the present embodiments. System 100 may include a plurality of computing systems 102A-102N (which may also be referred to as server (s) 102 or host system 102), each coupled to an adapter 114A (also referred to as an ISA) that interfaces with other devices and ISAs, as described below in more detail.

The computing system 102A may include one or more processors 104, also known as central processing units (CPUs). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

Processor 104 executes machine implemented instructions (or process steps/blocks) out of a memory 106 and interfaces with an interconnect 107 that may be referred to as a computer bus 107. The computer bus 107 may be, for example, a system bus, a Peripheral Component Interconnect (PCI) bus, PCI-Express (PCIe) bus, a HyperTransport or industry standard architecture bus, a SCSI bus, a universal serial bus (USB), an Institute of Electrical and Electronics Engineers (IEEE) standard 1394 bus (sometimes referred to as "Firewire"), or any other type of bus.

The host system 102A may further include a storage device 108, which may include, for example, a hard disk (HDD), a CD-ROM, a non-volatile memory device (flash or memory stick), a hybrid drive (sometimes referred to as SSHD), or any other storage device for storing structured or unstructured data. Storage 108 may store operating system program files (or data containers) and/or application program files, for example, email applications, database applications, management applications, and other application files. Some of these files are stored on storage 108 using an installation program. For example, the processor 104 may execute computer-executable process steps of an installation program so that the processor 14 can properly execute the application program.

In one embodiment, storage device 108 may be a solid state storage device (which may also be referred to herein as SSD 108). SSDs are becoming popular for servers that may need to store large amounts of data. ISA 114A described below in more detail may be used to manage and/or access storage device 108, according to one embodiment.

Memory 106 also interfaces with the computer bus 107 to provide the processor 104 with access to memory storage. Memory 106 may include random access main memory (RAM). When executing stored computer-executable process steps from storage 108, the processor 104 may store and execute the process steps out of memory 106. Read only memory (ROM, not shown) may also be used to store invariant instruction sequences, such as start-up instruction sequences or basic input/output system (BIOS) sequences for operation of a keyboard (not shown).

In one embodiment, processor 104 may execute an application 105A for performing certain functions. For example, application 105A may be a database application, a virtual machine executed in a virtual environment (provided by VMware Corporation, Microsoft Corporation or any other entity), an electronic email application (for example, Microsoft Exchange), or any other application type. Application 105A may issue read and write requests that are processed by ISA 114A, as described below in more detail. Application 105A may also be referred to as a "client."

The host system 102A also includes other devices and interfaces 109, which may include a display device interface, a keyboard interface, a pointing device interface and others. The details of these components are not germane to the inventive embodiments.

ISA 114A may be configured to handle both network and storage traffic while interfacing with other elements. In one embodiment, as described below in detail, ISA 114A may be configured to provide the functionality of a host bus adapter (HBA) by providing connectivity to SAN-(storage area network-) based storage arrays as well as present logical storage from a local storage device connected to the ISA. Various network and storage protocols may be used to handle network and storage traffic, for example, Ethernet, Fibre Channel, Fibre Channel over Ethernet (FCoE), Internet over Small Computer System Interface (iSCSI), and others. Some of the common protocols are described below.

Ethernet is a common network protocol used for network communication. The original Ethernet bus or star topology was developed for local area networks (LAN) to transfer data at 10 Mbps (megabits per second). Newer Ethernet standards (for example, Fast Ethernet (100 Base-T) and Gigabit Ethernet) support data transfer rates that are greater than 1 gigabit (GB). The various embodiments described herein may use Ethernet (which includes 100 Base-T and/or Gigabit Ethernet) as the network protocol. However, the adaptive embodiments disclosed herein are not limited to any particular protocol, as long as the functional goals are met by an existing or new network protocol.

Fibre Channel (or "FC") is a common storage protocol used in SANs. Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

A new and upcoming standard, called Fibre Channel over Ethernet (FCOE) has been developed to handle both Ethernet and Fibre Channel traffic in a SAN. This functionality would allow Fibre Channel to leverage high speed, for example, 10 Gigabit Ethernet networks while preserving the Fibre Channel protocol. In one embodiment, ISA 114A can be configured to operate as a FCOE adapter. Those of ordinary skill in the art will appreciate, however, that the present embodiments are not limited to any particular protocol.

iSCSI is an IP-based storage networking standard for linking data storage facilities. By carrying SCSI commands over IP networks, iSCSI is used to facilitate data transfers over intranets and to manage storage over long distances. iSCSI can be used to transmit data over local area networks (LANs), wide area networks (WANs), or the Internet and can enable location-independent data storage and retrieval.

The protocol allows clients to send SCSI commands (referred to as command or (control) data blocks (CDBs)) to SCSI storage devices (which may be referred to as targets) on remote servers. iSCSI is a SAN-based protocol, allowing organizations to consolidate storage into data center storage arrays while providing hosts (such as database and web servers) with the illusion of locally attached disks. Unlike traditional Fibre Channel, which uses special-purpose cabling, iSCSI can be run over long distances using existing network infrastructure. In one embodiment, ISA 114A may operate as an initiator as well as a target for responding to input/output I/O or IO) requests for reading and writing information at storage devices.

Storage space at a storage device (local or SAN-based) is typically presented to application 105A as a logical entity referred to as a logical unit number (LUN). Each LUN is uniquely identified by an identifier (LUN ID) and is associated with physical storage space. A LUN has a size associated with it that may indicate the amount of storage space that is made available to a computing system and a drive letter that may be used to access the LUN.

A LUN is typically divided into logical block addresses (LBAs) that are used by application 105A to read and write data to storage locations. The LBAs are mapped with actual physical storage to read and write data. A LUN used by an application may be referred to as a data LUN.

A LUN that is accessible via a SAN connection may be referred to as a SAN LUN. A LUN at a local storage device managed by ISA 114A and used as a cache may be referred to as cache LUN. A cache LUN may be used to cache data stored at a SAN LUN or another data LUN. The cache LUN is managed by ISA 114A and may not be visible to application 105A.

Referring back to FIG. 1A, computing system 102 uses an adapter interface 110 to communicate with ISA 114A via a link 112. In one embodiment, link 112 may be a PCI-Express link or any other interconnect type. The adaptive embodiments disclosed herein are not limited to any particular link type.

ISA 114A may communicate and interface with a mass storage system 120 via a SAN 116 that may include one or more switch(es) (may be referred to as fabric switch). The mass storage system 120 may include a plurality of storage devices 124A-124N. Storage space at storage devices 124A-124N may be presented as SAN LUNs to application 105A via SAN 116. Controller 122 of mass storage system 120 may be used to manage storage devices 124A-124N. In one embodiment, controller 122 may include a processor, an ISA 114A and other similar components.

System 100 may also include a management console 118, used according to one embodiment. Management console 118 may be a computer system similar to computing system 102A described above in detail. Management console 118 executes a management application 117 that may be used to configure storage space as logical structures (for example, as LUNs) that are presented to computing systems 102A-102N for storing information or as cache LUNs at local storage for caching information stored at SAN LUNs. Permissions associated with a LUN may also be configured using management application 117. The permissions indicate which entities may be allowed to access a LUN to read and/or write information. Management application 117 may store LUN attributes and permissions in a configuration data structure 117A at a storage location.

In one embodiment, ISA 114A is provided that can provide transparent data caching at SSDs while efficiently synchronizing the SSD data with SAN-based storage devices. The ISA enables management of data stored at the SSDs. The ISA also enables the SSDs to be shared as SAN storage allowing other servers 102B-102N to access data residing at SSDs in server 102A. ISA 114A may configure a LUN from the local storage 108 and present the LUN to servers 102A-102N, allowing the local storage 108 to be shared by other Servers 102B-102N.

In another embodiment, ISA 114A provides traditional SAN connectivity to computing systems 102A and to the SSDs at each computing system. The SSDs may be managed as a storage pool that may be configured to operate as a cache pool to cache read/write data for SAN LUNs presented to the computing systems. SAN LUNs when configured may be tagged with an attribute that allows caching at the local. SSDs for read and/or write caching.

Figure 1B:
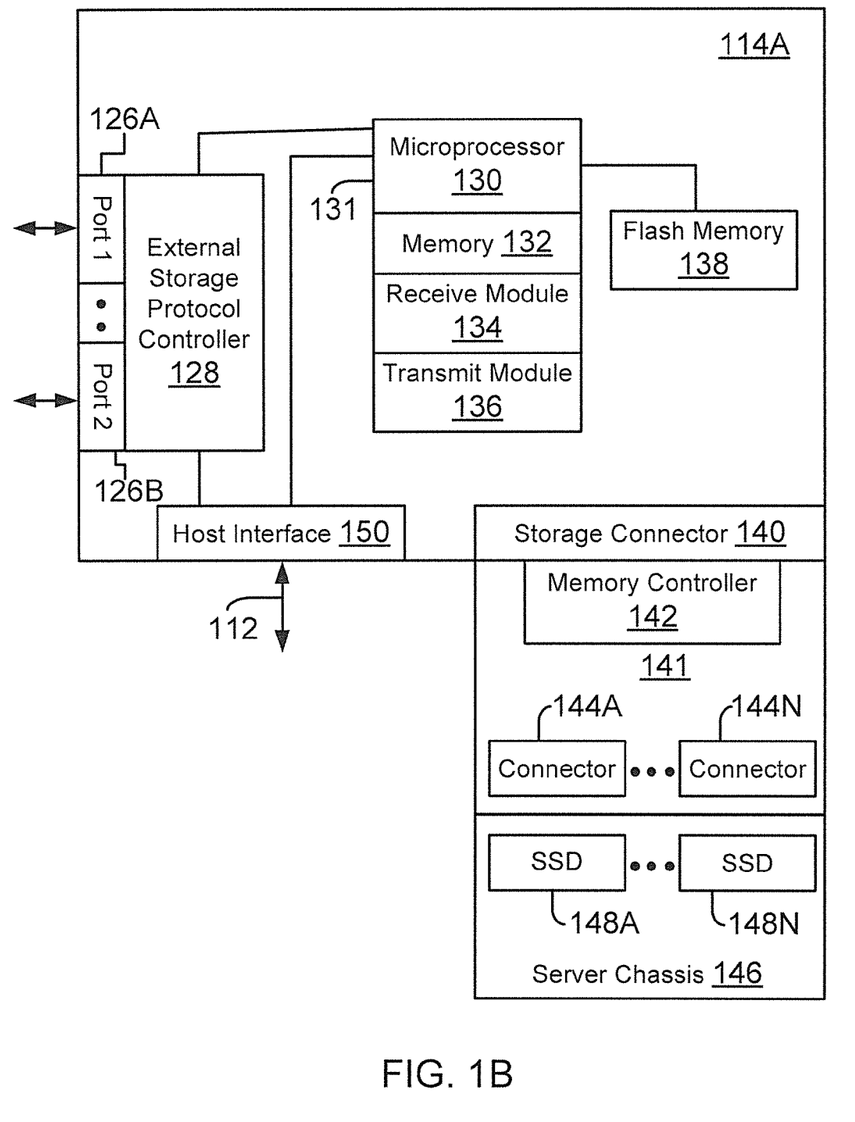
FIG. 1B shows an example of an intelligent storage adapter (ISA)

FIG. 1B shows an example of ISA 114A that includes a storage protocol controller 128 (shown as "external storage protocol controller") with ports 126A and 126B. The storage protocol controller may be a Fibre Channel controller (or application specific integrated circuit (ASIC)) that is available from QLogic Corporation for interfacing with Fibre Channel based storage devices via ports 126A/126B. Ports 126A/126B include logic and circuitry for sending and receiving Fibre Channel frames. Fibre Channel is simply shown as an example and the various embodiments disclosed herein are not limited to any particular storage/network protocol. Thus ports 126A-126B are not limited to just Fibre Channel ports. Furthermore, although only two ports 126A and 126E are shown as an example, the adaptive embodiments disclosed herein are not limited to any particular number of ports.

Storage protocol controller 128 may operate as a host bus adapter for managing I/O requests for SAN-based storage. Storage protocol controller 128 is configured to process I/O requests for reading data from SAN-based storage (124A-124N) and writing data to SAN-based storage. Thus storage protocol controller 128 is used to take advantage of existing SAN infrastructure, while providing access to SSDs for computing systems 102A-102N.

In one embodiment, storage protocol controller 128 includes a processor (not shown) for executing the Fibre Channel stack having layers, FC0-FC3. FC0 is defined by the Fibre Channel specification as the physical layer, which includes cables (fiber optics, twisted-pair), connectors and others. FC1 layer is defined as the data link layer. This layer implements the 8B/10B encoding and decoding of signals. FC2 layer is defined as the network layer. This layer defines the main Fibre Channel framing, addressing, and control protocols. FC3 layer is an auxiliary layer that provides common services like encryption or RAID related. FC4 layer is the protocol mapping layer where other protocols, such as SCSI are encapsulated into an information unit for delivery to FC2 and transmission across a Fibre Channel network. This layer provides flexibility to Fibre Channel as a networking technology compatible with other technologies.

ISA 114A also includes a host interface 150 that interfaces with processor 104 via link 112. The structure of host interface 150 will depend on the type of connection/interconnect used to communicate with processor 104. For example, if a PCI-Express link is used to communicate with processor 104, then host interface 150 includes logic and circuitry for receiving and sending PCI-Express packets/information.

ISA 114A includes a system on chip (SOC) 131 that includes a processor 130 having access to an adapter memory (which may also be referred to as local memory)

132. Processor 130 may be one or more programmable general-purpose or special-purpose microprocessors, digital signal processors (DSPs), programmable controllers, application specific integrated circuits (ASICs), reduced instruction set computer (RISC), programmable logic devices (PLDs), or the like, or a combination of such hardware devices. Memory 132 may be used to store firmware instructions and various data structures for ISA 114A for controlling overall ISA 114A operations. Memory 132 may also store instructions for implementing the various embodiments described herein.

SOC 131 may also include a receive module 134 and a transmit module 136. The receive module 134 may be used to store packets that are received via ports 126A/126B, while transmit module 136 may be used to store information that is transmitted via ports 126A/126B or to local SSDs that are described below. Receive module 134 and/or transmit module 136 may be separate modules and may include more than one component for processing received information or information that is transmitted.

ISA 114A may also include a non-volatile memory 138 (shown as flash memory) for storing parameters/instructions that may be used by processor 130 for executing the instructions described below in detail. ISA 114A also includes a storage connector 140 that interfaces with another card 141 (which may also be referred to as a daughter card 141), according to one embodiment. In one embodiment, the storage connector may be a PCI-Express connector, PCI connector or any other connector type based on the interconnect used by SOC 131 to interface with the SSDs. The daughter card 141 includes a memory controller 142 that interfaces with a plurality of connectors' 144A-144N. The plurality of connectors' 144A-144N are used to plug in SSDs 148A-148N (similar to storage 108). In this embodiment, SSDs 148A-148N are included within a server chassis 146. In one embodiment, connectors' 144A-144N may be SATA connectors for receiving SSDs 148A-148N. In another embodiment, connectors' 144A-144N may be SAS connectors.

ISA 114A has SAN connectivity because of ports 126A-126B, similar to a host bus adapter, as mentioned above. The storage protocol controller 128 allows SAN storage-based processing. Unlike conventional HBAs, ISA 114A also includes a storage connector 140 that provides local storage solutions via SSDs 148A-148N.

In another embodiment of ISA 114A is configured such that a daughter card has the SSDs 148A-148N on the card itself, rather than on the server chassis 146. In another embodiment of ISA 114A is configured such that the memory controller 142 is on the same card as the other components of ISA 114A. Similarly, in an embodiment, the SSDs 148A-148N also may be on the same card connected via one or more storage connectors.

Figure 1C:
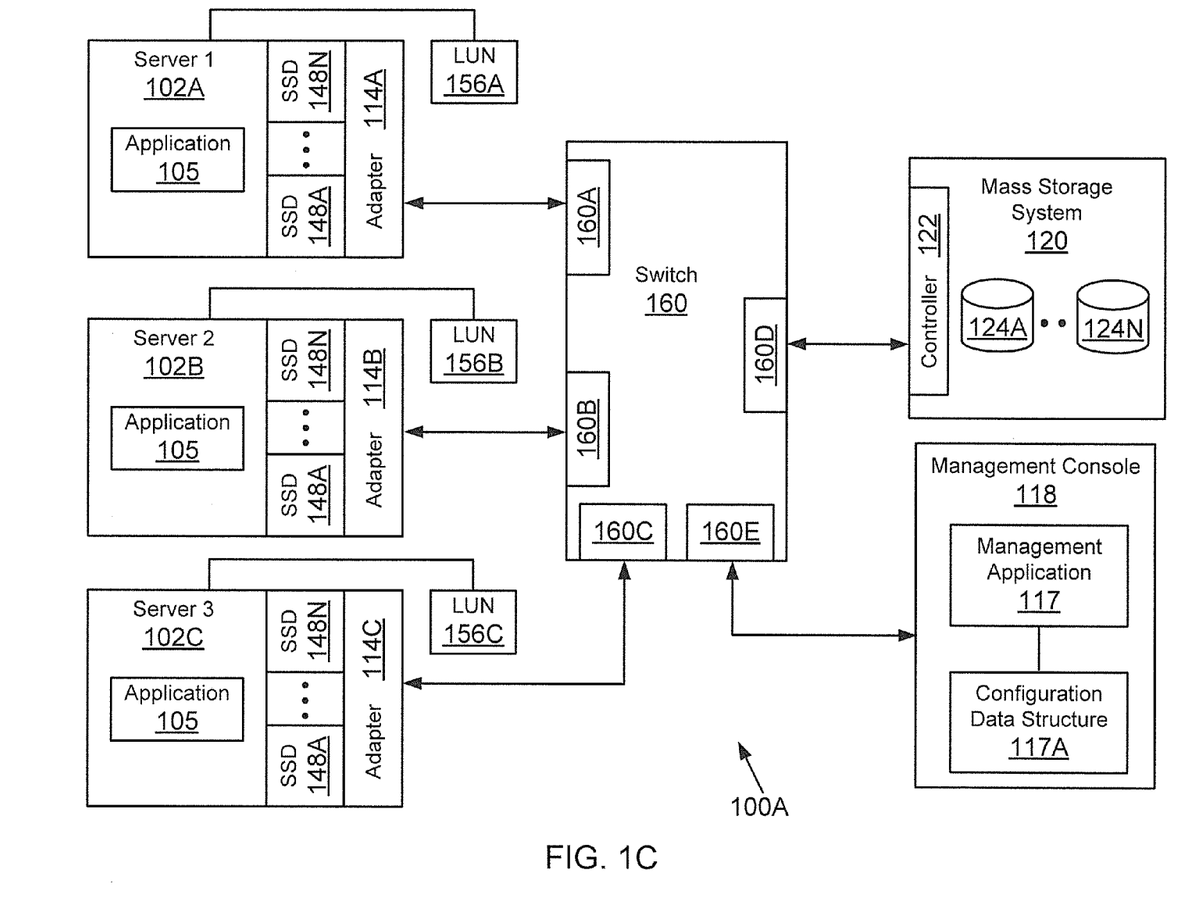
FIG. 1C shows an example of a configuration for using the ISAs, according to one embodiment.

FIG. 1C shows a system 100A where each ISA 114A-114C in servers' 102A-102C are coupled to a fabric switch 160, according to one embodiment. ISAs 114B and 114C are similar to 114A, described above. Fabric switch 160 that is a part of SAN 116 (shown in FIG. 1A) includes a plurality of ports 160A-160E. Ports 160A-160C are coupled to ISA 114A-114C ports, respectively, while port 160D is coupled to controller 122 of the mass storage system 120. Management console 118 may be coupled to port 160E for configuring various components of system 100A.

Management console 118 may also be used to configure LUNs 156A-156C that are presented to servers 102A-102C for storing information. LUNs 156A-156C are illustrated merely as representative of a much larger number of LUNs in a given system 100A. The LUNs may be based on storage located at SAN-based mass storage 120 or at a local SSD 148A-148N.

The LUNs 156A-156C may be configured to operate as local LUNs. In this configuration, the LUN may be used as a "boot" LUN. The LUN may be used by the host computing system to which it is presented. One or more ISAs may present the boot LUN to any of the servers that are served by a cluster of ISAs. LUNs 156A-156C may also be configured as SAN mirror LUNs. In such a configuration, the LUN 156B, for example, is a mirror of a LUN that is associated with a SAN-based storage device. LUNs 156A-156C may also be configured as Peer Mirror LUNs. In such a configuration, the LUN 156C, for example, is mirrored across at least two ISAs and hence can be made accessible to at least two servers.

The LUNs 156A-156C may also be accessible by one or more servers via SAN 116 (of FIG. 1A or Switch 160 of FIG. 1C). In this example, a DAS-(direct attached storage-) based SSD becomes accessible as SAN storage, while the DAS-based storage is still managed by an application 105A (for example, a database application).

In FIG. 1C, in one embodiment ISA 114A in server 102A acts as a storage protocol controller for LUN 156A, serving up LUN 156A to other initiators, for example, ISA 114B in server 102B and ISA 114C in server 102C. At the same time, ISA 114A also acts as a traditional HBA (initiator) for SAN LUNs at SAN storage devices 124A-124N.

In one embodiment, ISAs 114A-114C operate within a cluster. The cluster is configured using management application 117. The cluster is identified by a unique identifier. Within the cluster, a specific ISA may operate as a LUN owner of a "cache owner." The cache owner adapter interfaces with the SAN LUN for executing read and write operations. As an example, adapter 114A may be the cache owner for LUN 156A that is presented to application 105A. In this configuration, ISA 114B becomes the client ISA or the client adapter.

Figure 2:
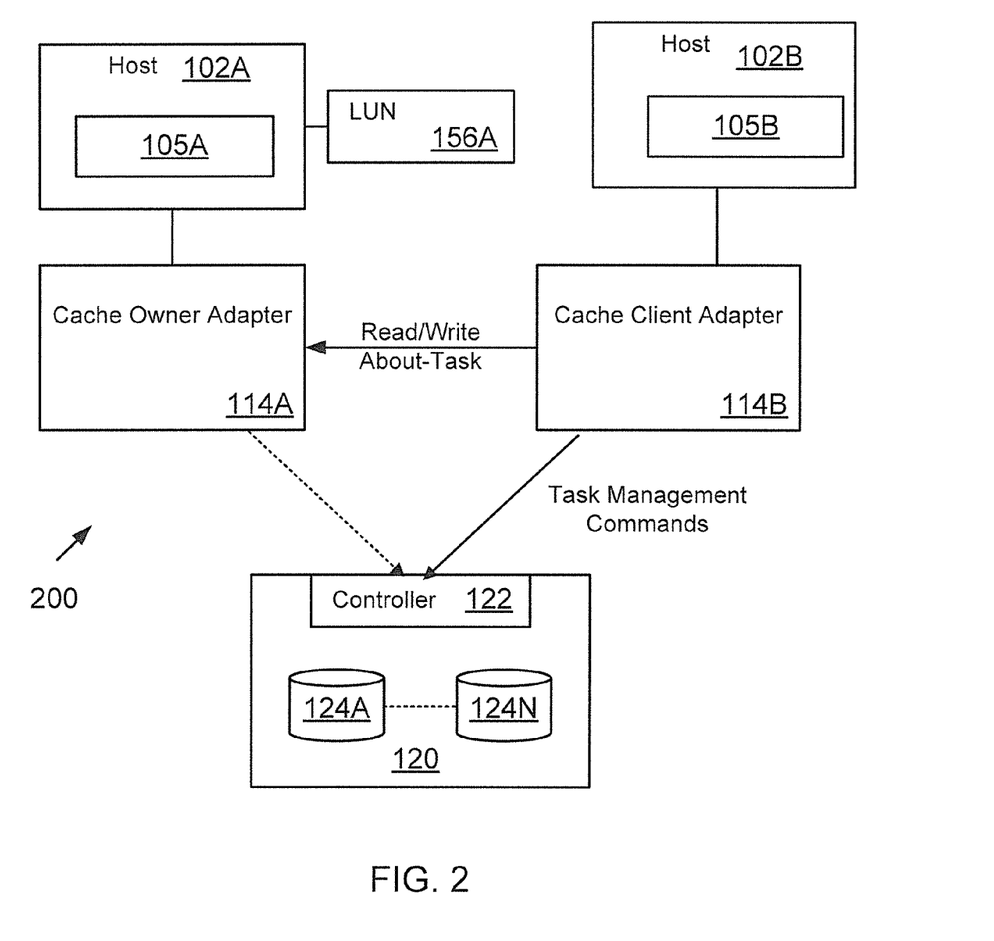
FIG. 2 shows a system using the adaptive aspects of the present disclosure.

FIG. 2 shows an example of a cluster 200, where ISA 114A is a cache owner adapter and ISA 114E is a cache client adapter.

In conventional systems, when a cache client adapter 114B receives an I/O request to read and write to a SAN LUN 156A, it forwards the request to cache owner adapter 114A. The cache owner adapter 114A interfaces with storage system 120 to execute the I/O operation (i.e. read or write data).

In conventional systems, the cache client adapter not only forwards I/O requests, but also forwards task management requests (or functions, used interchangeably throughout this specification) to the cache owner adapter. The requests may be sent as a FCP_CMD IU. The task management requests may include a command to reset a LUN, reset a Target, or abort a task. The cache owner adapter interfaces with the storage system 120 and after the management tasks are completed, the cache client adapter is notified by the cache owner adapter. The cache client adapter then notifies the host that initiated the task management command. The conventional process is inefficient because it adds latency for completing management tasks. The adaptive embodiments provide a better solution, as described below in detail.

In one embodiment, the cache client adapter 114B only forwards the "Abort Task" management command to the cache owner adapter 114A. Other task management requests, for example, LUN reset and Target reset are forwarded to controller 122. Controller 122 responds directly to the cache client adapter 114B. This reduces latency because cache owner adapter 114A does not have to operate as an intermediary between the cache client adapter and the storage system 120.

Figure 3:
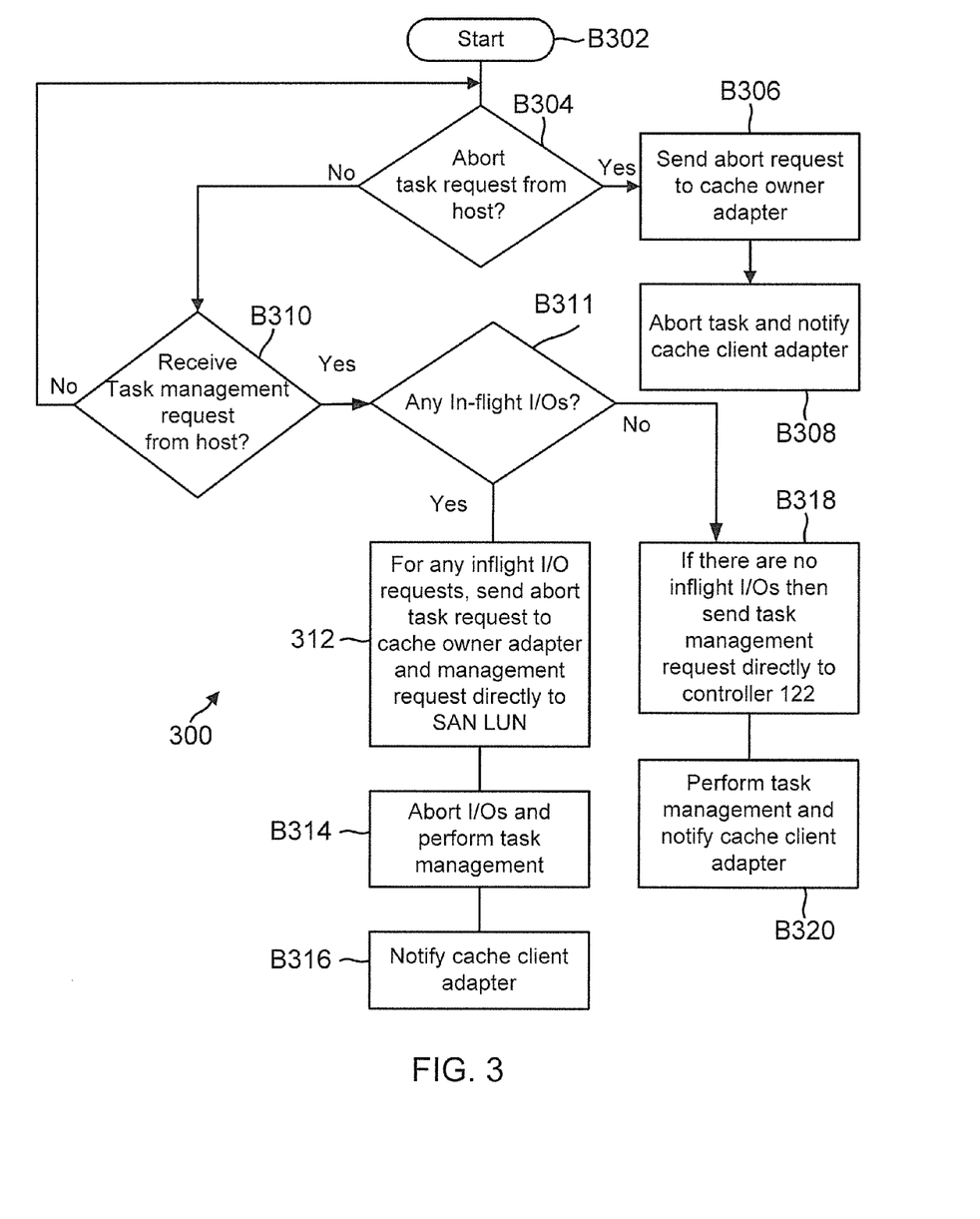
FIG. 3 shows a process flow according to one embodiment of the present disclosure.

FIG. 3 shows a process 300 for handling task management commands in a cluster 200 having at least two ISAs, according to one embodiment. The process begins in block B302. The cluster 200 having ISAs 114A and 114B is already configured. The cluster is not limited to any particular number of ISAs.

In block B304, cache client adapter 114B determines if it has received an "Abort Task" request from host 102B to abort any task involving LUN 156A that is owned by cache owner adapter 114A. If yes, then in block B306, the Abort Task request is sent by cache client adapter 114B to cache owner adapter 114A. The task is aborted by storage system 120 (i.e. controller 122) and then cache owner adapter 114A notifies the cache client adapter 114B.

If the abort task request is not received from the host system, then in block B310, the cache client adapter 114B determines if another task management request has been received from host 102B, for example, a LUN reset, a target reset or any other task management request. If not, the process loops back to block B304.

If a task management request is received, then in block B311, cache client adapter 114B determines if there are any I/O requests that are in process (i.e. in-flight). The cache client adapter 114B maintains a list of I/O requests that it forwards to the cache owner adapter 114A at a data structure stored at a memory device of cache client adapter 114B. The data structure is used by the cache client adapter 114B to determine if there are any in-flight I/O requests. If there are any in flight I/O requests, then in block B312, the cache client adapter 114B sends an abort request to cache owner adapter 114A to abort those requests and sends the task management request directly to controller 122 of system 120 (Block B312). The I/O operations are aborted (by cache owner adapter 114A) and the controller 122 executes the tasks that are associated with the task management request (Block B314). Then in Block B316, the controller 122 notifies the cache client adapter 114B directly regarding completion of the task management requests.

When there are no in-flight I/O requests, then in block B318, the cache client adapter 114E sends the task management request to the controller 122 (instead of cache owner adapter 114A in conventional systems). In block B320, the controller 122 executes the management tasks associated with the task management request. The cache client adapter 114B is notified directly by the controller 122. Thereafter, the cache client adapter 114B notifies the host 102B that had sent the task management request The embodiments described above have advantages over conventional systems. For example, because the cache client adapter communicates with controller 122 directly for certain task management requests, overall latency in processing those requests is reduced because the cache owner adapter does not have to operate as an intermediary.

Although the present disclosure has been described with reference to specific embodiments, these embodiments are illustrative only and not limiting. For example, although the description above has been described with respect to an ISA, any other device may be configured to perform the foregoing function. Thus the term adapter and device are interchangeable. Many other applications and embodiments of the present disclosure will be apparent in light of this disclosure and the following claims. References throughout this specification to "one embodiment" or "an embodiment" means that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the disclosure, as will be recognized by those of ordinary skill in the art.

What is claimed is:

1. A machine implemented method, comprising;
receiving a task management request other than an abort task request at a cache client adapter from a client system for a logical storage object that is presented to the client system by the cache client adapter while being owned and managed by a cache owner adapter that communicates with the cache client adapter via a network connection;
wherein both the cache client adapter and the cache owner adapter communicate with a controller that manages a storage device whose storage space is used for the logical storage object to store data;
determining by the cache client adapter if there are any pending input/output (I/O) requests associated with the logical storage object that have been sent to the cache owner adapter;
sending an abort request by the cache client adapter to the cache owner adapter to abort pending I/O requests, when there are pending I/O requests;
sending the task management request directly to the controller instead of the cache owner adapter;
receiving a completion notification by the cache client adapter directly from the controller, after the task management request is executed; and
notifying the client system of the completion by the cache client adapter.

2. The method of claim 1, wherein the logical storage object is a logical unit number (LUN).

3. The method of claim 2, wherein the LUN is based on a storage space at the storage device accessible via a storage area network.

4. The method of claim 2, wherein the task management request is a LUN reset request to reset the LUN.

5. The method of claim 1, further comprising
receiving a second task management request that is an abort task request; and
forwarding the second task management request to the cache owner adapter.

6. The method of claim 1, wherein the cache client adapter and the cache owner adapter operate within a cluster identified by a unique identifier.

7. The method of claim 1, wherein the cache client adapter maintains a data structure to track I/O requests that are sent to the cache owner adapter by the cache client adapter for the logical storage object to store data or read data.

8. A non-transitory, machine readable storage medium storing executable instructions, which when executed by a machine, causes the machine to perform a method, the method comprising:
receiving a task management request other than an abort task request at a cache client adapter from a client system for a logical storage object that is presented to the client system by the cache client adapter while being owned and managed by a cache owner adapter that communicates with the cache client adapter via a network connection;

wherein both the cache client adapter and the cache owner adapter communicate with a controller that manages a storage device whose storage space is used for the logical storage object to store data;

determining by the cache client adapter if there are any pending input/output (I/O) requests associated with the logical storage object that have been sent to the cache owner adapter;

sending an abort request by the cache client adapter to the cache owner adapter to abort pending I/O requests, when there are pending I/O requests;

sending the task management request directly to the controller instead of the cache owner adapter;

receiving a completion notification by the cache client adapter directly from the controller, after the task management request is executed; and notifying the client system of the completion by the cache client adapter.

9. The storage medium of claim 8, wherein the logical storage object is a logical unit number (LUN).

10. The storage medium of claim 9, wherein the LUN is based on a storage space at the storage device accessible via a storage area network.

11. The storage medium of claim 9, wherein the task management request is a LUN reset request to reset the LUN.

12. The storage medium of claim 8, wherein the method further comprises:

receiving a second task management request that is an abort task request; and forwarding the second task management request to the cache owner adapter.

13. The storage medium of claim 8, wherein cache client adapter and the cache owner adapter operate within a cluster identified by a unique identifier.

14. The storage medium of claim 8, wherein the cache client adapter maintains a data structure to track I/O requests that are sent to the cache owner adapter by the cache client adapter for the logical storage object to store data or read data.

15. A system, comprising:

a cache client adapter for receiving a task management request other than an abort from a client system for a logical storage object that is presented to the client system by the cache client adapter while being owned and managed by a cache owner adapter that communicates with the cache client adapter via a network connection and determining if there are any pending in-put/output (I/O) requests associated with the logical storage object; wherein the cache client adapter sends an abort request to the cache owner adapter to abort pending I/O requests and sends the task management request directly to a controller that manages a storage device whose space is presented as the logical storage object to store data; and wherein the controller executes the task management request and sends a completion notification directly to the cache client adapter that notifies the client system of the completion notification.

16. The system of claim 15, wherein the logical storage object is a logical unit number (LUN).

17. The system of claim 16, wherein the LUN is based on a storage space at the storage device accessible via a storage area network.

18. The system of claim 16, wherein the task management request is a LUN reset request to reset the LUN.

19. The system of claim 15, wherein when the cache client adapter accepts a task management request that is the abort task request, then the abort task request is forwarded by the cache client adapter to the cache owner adapter.

20. The system of claim 15, wherein the cache client adapter and the cache owner adapter operate within a cluster identified by a unique identifier.

21. The system of claim 15, wherein the cache client adapter maintains a data structure to track I/O requests that are sent to the cache owner adapter by the cache client adapter for the logical storage object to store data or read data.

* * * * *

UNITED STATES PATENT AND TRADEMARK OFFICE
CERTIFICATE OF CORRECTION

PATENT NO.        : 9,436,654 B1
APPLICATION NO.   : 14/312130
DATED             : September 6, 2016
INVENTOR(S)       : Anurag Verma Page 1 of 1

It is certified that error appears in the above-identified patent and that said Letters Patent is hereby corrected as shown below:

In the Specification

In Column 6, Line 15, after "local" delete ".".

In Column 6, Line 29, delete "126E" and insert -- 126B --, therefor.

In Column 8, Line 40, delete "114E" and insert -- 114B --, therefor.

In Column 9, Line 43, delete "114E" and insert -- 114B --, therefor.

In Column 9, Line 50, after "request" insert -- . --.

In the Claims

In Column 12, Line 9, Claim 15, delete "in-put/output" and insert -- input/output --, therefor.

Signed and Sealed this
Tenth Day of January, 2017

Michelle K. Lee
*Director of the United States Patent and Trademark Office*